United States Patent

Yamamoto et al.

[11] Patent Number: 6,007,088
[45] Date of Patent: Dec. 28, 1999

[54] AIR BAG APPARATUS

[75] Inventors: Tadashi Yamamoto, Aichi-ken; Shinji Oguchi, Nagoya, both of Japan

[73] Assignee: Toyoda Gosei Co., Ltd., Aichi-ken, Japan

[21] Appl. No.: 08/951,011

[22] Filed: Oct. 15, 1997

[30] Foreign Application Priority Data

Oct. 18, 1996 [JP] Japan ................................ 8-276554
Jun. 25, 1997 [JP] Japan ................................ 9-168380

[51] Int. Cl.⁶ .................................................. B60R 21/16
[52] U.S. Cl. ................................. 280/728.3; 280/731
[58] Field of Search ........................... 280/728.1, 743.1, 280/728.3, 731

[56] References Cited

U.S. PATENT DOCUMENTS

| | | | |
|---|---|---|---|
| 4,836,576 | 6/1989 | Werner et al. | 280/731 |
| 4,903,986 | 2/1990 | Cok et al. | 280/731 |
| 5,161,819 | 11/1992 | Rhodes | 280/728.3 |
| 5,324,070 | 6/1994 | Kitagawa et al. | 280/730.1 |
| 5,330,223 | 7/1994 | Hiramitsu et al. | 280/728.3 |
| 5,681,052 | 10/1997 | Ricks et al. | 280/731 |

*Primary Examiner*—Paul N. Dickson
*Attorney, Agent, or Firm*—Pillsbury Madison & Sutro LLP

[57] ABSTRACT

An air bag apparatus, assembled in a vehicle steering wheel, is provided with an inflator, an air bag in a folded state and a cover for covering the folded air bag. The cover provided with a hinged door portion which is opened by a force at a time when the bag body is initially developed and inflated as it deploys. The air bag is folded to one direction to form a long and narrow shape having a predetermined width and both ends of the long and narrow shape are housed in a housing space formed between the inflator and the cover in the form of outwardly winding rolls. At a time of initial development of the air bag, each outer surface of the outwardly winding rolls is brought into contact with a wall surface of the housing space opposing to the outer surface by a gas supplied from the inflator so that the development of the outwardly winding rolls is temporally delayed.

8 Claims, 8 Drawing Sheets

(a)

(b)

(c)

(d)

(a)

(b)

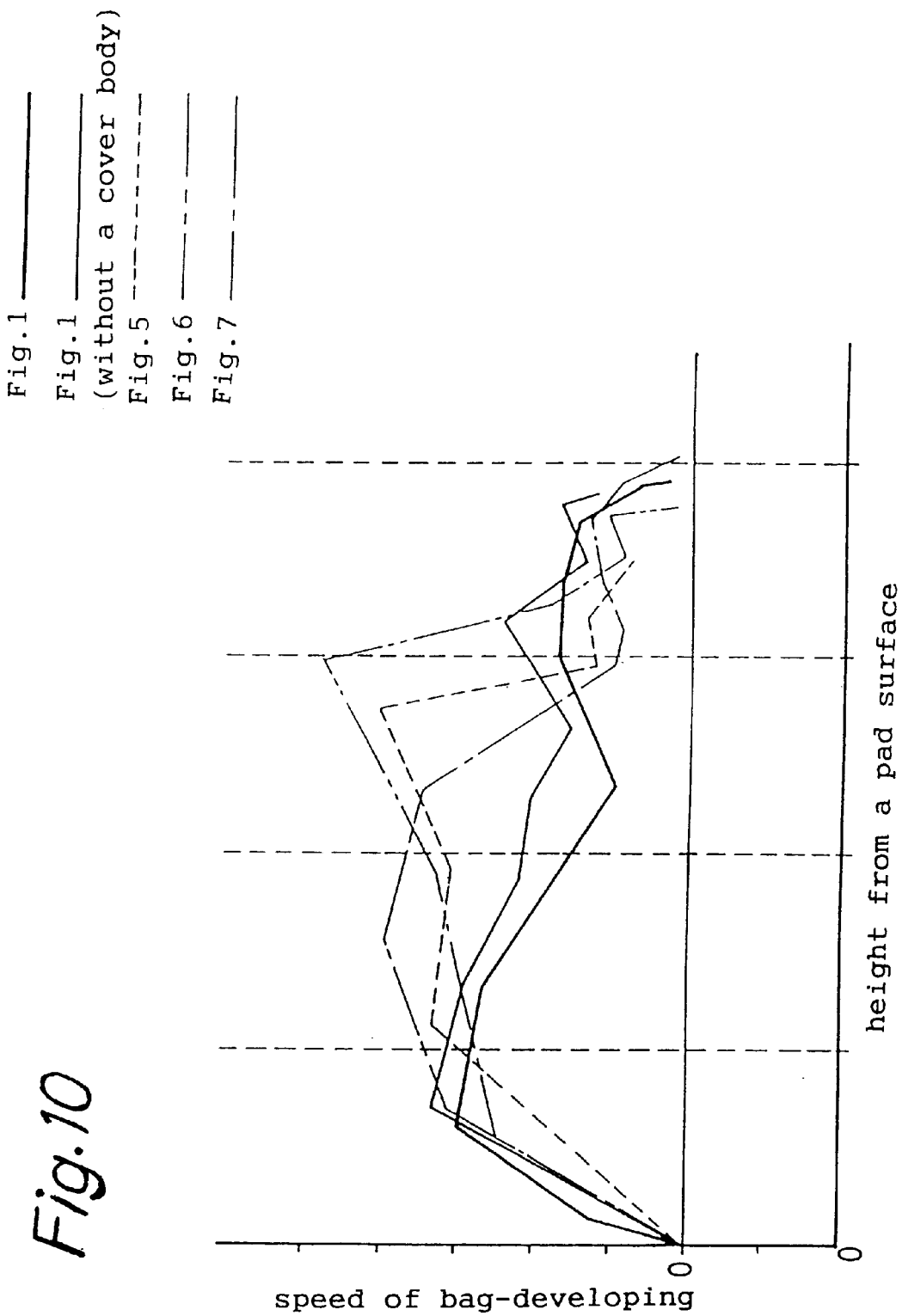

AIR BAG APPARATUS

BACKGROUND OF THE INVENTION

1. Field of the Invention

The present invention relates to an air bag apparatus assembled in a steering wheel or the like of a vehicle and which develops and inflates a bag body in a direction toward a vehicle occupant to protect that vehicle occupant.

The present invention, while explained with reference to an embodiment of an air bag apparatus for a steering wheel, it can be equally applied to other air bag apparatus for an assistant driver's seat or a rear seat having a similar structure.

In this specification, each of the terms "vertical", "lateral" and "longitudinal", which shows a relationship between positions means a relative relationship between positions from a viewpoint in front view of the steering wheel with the vehicle going straight ahead.

2. Description of Related Art

Air bag apparatus usually includes an inflator, an air bag mounted to the inflator in a folded state, from an original circular shape, and a cover for covering the folded bag body. The cover is provided with a hinged door portion which opens by a force applied at a time when the air bag is initially developed and inflated.

On the basis of the present demand, in which the air bag of the air bag apparatus is preferentially developed and inflated in a vertical direction, an example of such, an air bag apparatus is described in Japanese Patent Publication No. 7-110600.

This air bag apparatus for a driver's seat is mounted to a substantially central portion of a steering wheel and comprised an inflator for generating a gas for developing an air bag. The air bag is arranged in a folded body state and surrounds a gas injection hole of the inflator, it has a circular shape when inflated and is covered by a cover member capable of suddenly breaking open.

The cover member included an upper flap which opens to an upper side of the steering wheel and a lower flap which opens to a lower side of the steering wheel.

In some cases a center line which agrees with the direction in which the upper and lower flaps of the cover member are broken and developed, passes through a center point of the air bag is defined as Y, and that a center line which crosses the center line Y in a perpendicular direction and passes through a center point of the air bag is defined as X, The air bag is formed with a long and narrow shape in the Y direction by folding right and left side surfaces disposed in right and left side of the center line Y to a side of the seated occupant along a first folding line parallel to the center line Y.

Each of the side surfaces of the long and narrow shape, disposed in both side of the center line X, is folded to the side of the seated occupant along a second folding line parallel to the center line X so as to form the folded body having an upper surface and a lower surface which respectively open in an upper direction and a lower direction at an initial time of developing.

However, as a result of inflation testing of the foregoing air bag apparatus performed by the inventors of the present invention, it is found that there is a fast a change of the speed of an inflation between the time when the air bag body is in a middle position and when the air bag body is completely inflated (hereinafter refer to "inflation speed in the middle portion height").

Though it is necessary for the air bag body to completely inflate within a predetermined time, it is preferable that the inflation speed be slow in the middle portion until full inflation is completed.

SUMMARY OF THE INVENTION

The present invention is made by taking the above described problems into consideration and an object of the present invention is to provide an air bag apparatus which can limit the inflation speed in the middle portion at a time when the air bag apparatus is operated.

Another object of the present invention is, in addition to the above object, to provide an air bag apparatus which can preferentially develop and inflate an air bag body in a vertical direction relative to a front to rear axis.

One aspect of the present invention solves the above first object in accordance with the following structure. On an air bag apparatus which is assembled in a steering wheel or the like of a vehicle and which develops and inflates an air bag in a direction toward a vehicle occupant at a time of operation. The air bag apparatus comprises an inflator, an air bag or bag body which is mounted substantially at a center of an upper surface of the inflator in a folded state and a cover for covering the folded bag body. The cover body is provided with a hinged door portion which is opened by a force applied at a time when the bag body is initially developed and inflated. The air bag body is folded to a direction so as to be formed with a long and narrow shape having a predetermined width and both end portions of the long and narrow shape are housed within a housing space formed by the inflator and the cover body in a state of an outwardly winding roll.

In the above structure, it is preferable that the housing space is provided with an overhang portion which covers a front surface of the outwardly winding roll close to an outer side.

It is preferable that the overhang portion is formed by a door adjacent portion which is disposed adjacent to right and left outer side of the hinged door portion in the cover body.

In the above structure, it is preferable that the cover body is provided with a breakage prescribed portion having a H-shaped front view in a state of going straight ahead of the vehicle, the hinged door portion is formed as a double-leafed hinged door in the vertical direction, and the outer ends of the outwardly winding roll are positioned outside of right and left sides of the H-shaped breakage prescribed portion having a thin thickness so as to achieve the object of preferentially develop and inflate the vertical direction of the air bag body in the front view at a state of going straight ahead of the vehicle.

Further, in the structure in which a bag holder for holding the bag body is provided with a side wall projecting to the cover body, the overhang portion may be formed by a side wall extending portion which is formed by extending the side wall to an inner direction, and in the structure in which the side wall is provided with a metal projecting portion in an inner side thereof and a bag protecting plate is mounted to an inside of the metal projecting portion, the overhang portion may be formed by a protecting plate extending portion which is formed by extending the bag protecting plate to an inner direction.

BRIEF DESCRIPTION OF THE DRAWINGS

FIG. 10 is a graph which shows the relationship between developing height of an air bag and inflation speed (the speed at which the air bag is developed).

DESCRIPTION OF THE PREFERRED EMBODIMENTS

An embodiment in accordance with the present invention will be explained below with reference to the attached drawings.

Figure 1:
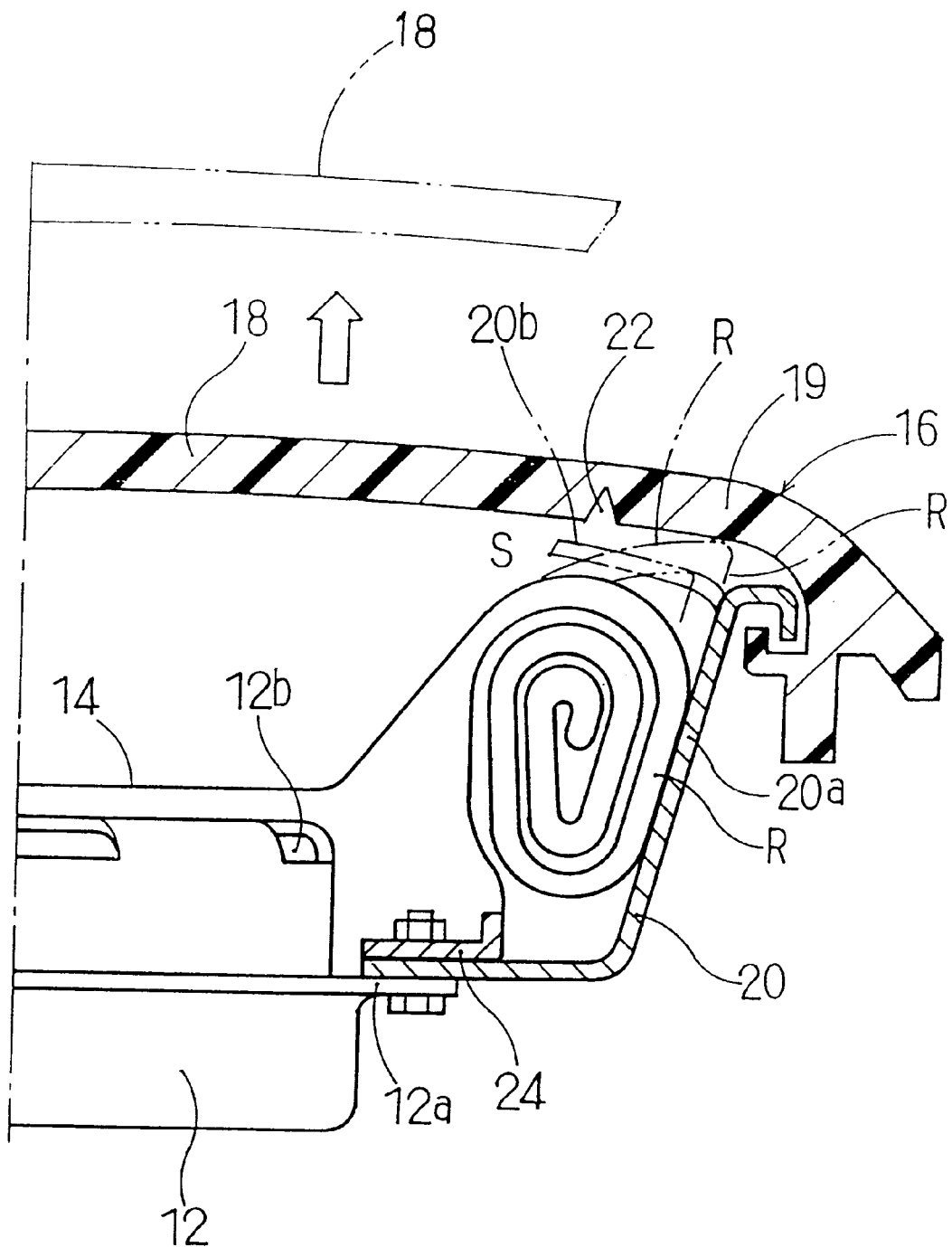
FIG. 1 is a schematic cross-sectional view which shows a half of an air bag apparatus in accordance with an embodiment of the present invention.
Figure 2:
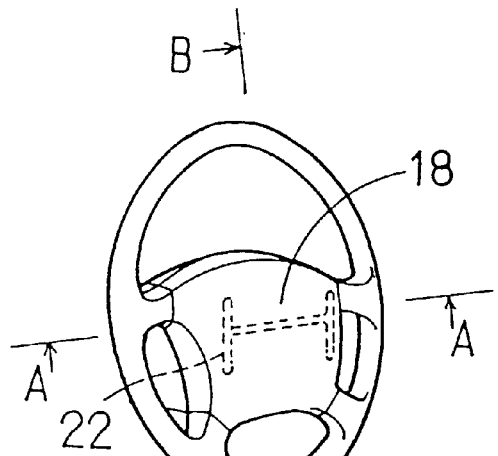
FIGS. 2A, 2B, 2C and 2D are perspective views which show the development of an embodiment of an air bag apparatus in accordance with the present invention as it inflates.
Figure 2:
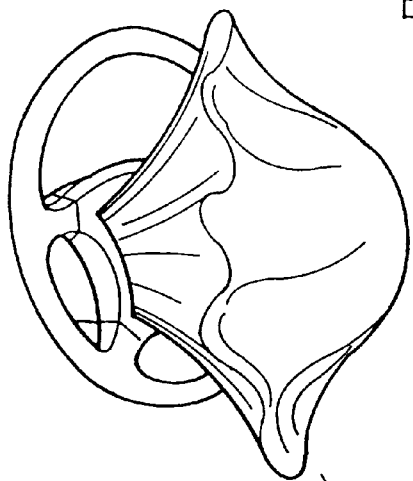
Figure 2:
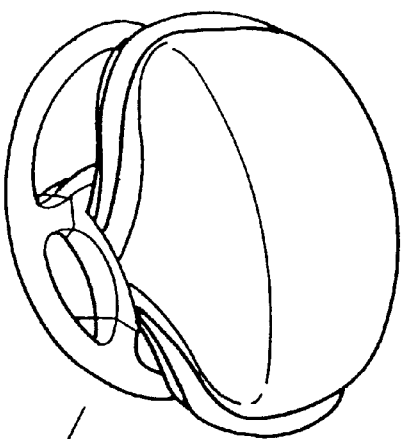
Figure 2:
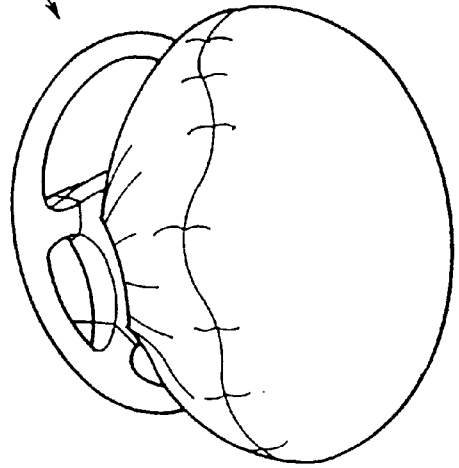

The first embodiment of an air bag apparatus of the present invention basically comprises an inflator 12, a bag body or airbag 14 which is mounted to the inflator 12 in a folded state, and has an original developed circular shape, and a cover 16 for covering the folded bag body as shown in FIG. 1 which corresponds to a cross-sectional view along a line A—A in FIG. 2. The cover 16 is provided with hinged door portions 18 which open due to an inflation force of the air bag 14 and with adjacent of side portions 19 disposed adjacent to right and left outer sides thereof.

In the embodiment shown in FIG. 1, the cover 16 is attached through an air bag housing or case 20 mounted to a flange portion 12a of the inflator 12 of a flat cylindrical double step type. The cover 16 is provided with a tear seam 22 having a reduced thickness and a H-shaped front profile when viewed from the art side as shown in dotted line in FIG. 2A. The hinged door portions 18 can open together on hinges in a vertical direction along the tear seam 22 which leaves intact the adjacent portions 19. In this case, the tear seam 22 is formed on an interior surface of the cover 16, however, it may be formed on both the front end interior surfaces of cover 16.

Further, the structure of the cover 16 is not limited to the structure shown in the drawing but may be attached to the inflator or a core metal through an insert or be integrally formed with the steering wheel. Still further, the hinged door may be structured to open in one direction or alternatively may be structured to open in a lateral direction.

In the air bag apparatus having the above structure, in accordance with the present embodiment, the air bag 14 is folded in one direction, that is, the air bag 14 is laterally folded in the lateral direction so as to form a long and narrow shape having a predetermined width as shown in FIG. 3B, with the resulting folds shown from the end view in FIG. 3C, and both lateral side portions of the laterally long and narrow shape are housed within a lateral housing space S, shown in FIG. 1, formed by the inflator 12 and the cover 16 in a state of or corresponding to an outwardly winding roll.

Then, the walls forming the housing space S includes cover 16 and the overhanging side portions 19 and side wall 20a which covers a front surface of the outwardly winding roll R close to an outer side.

Figure 3:
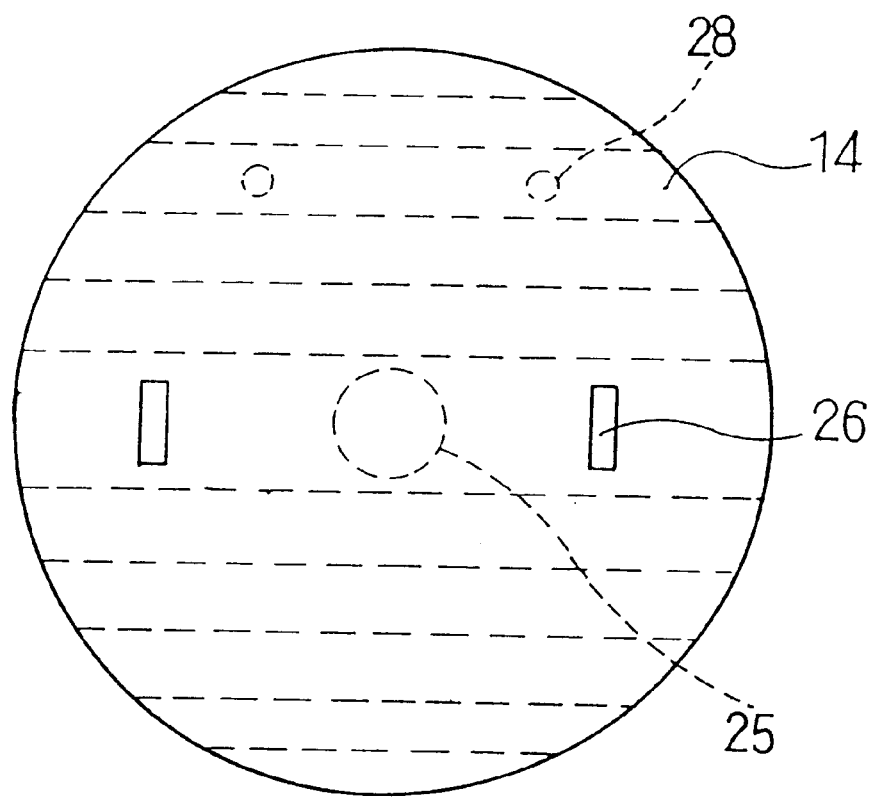
FIGS. 3A, 3B and 3C are views which show a lateral folding of an air bag body in accordance with the present invention.
Figure 3:
Figure 3:
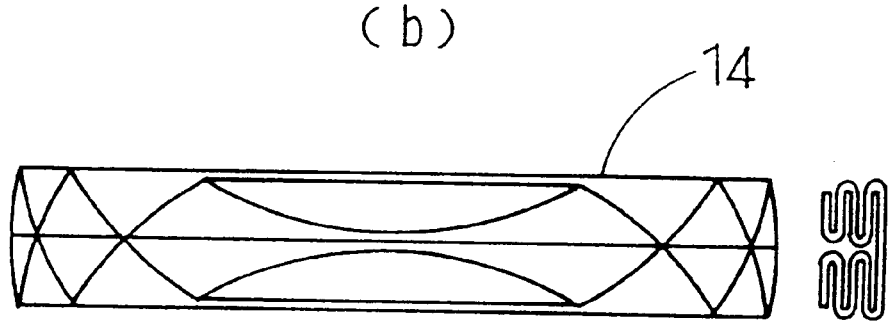
Figure 4:
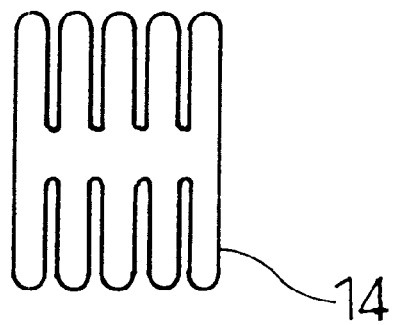
FIG. 4 is a cross-sectional view showing a bellows folding of an air bag body which can be used in the present invention.

In this case, the aspect of the lateral folding is not specially limited, however, it is preferable to uniformly develop development of the air bag in a vertical direction. It is preferable to employ either multi-steps folding, as shown in FIG. 3, in which the air bag 14 having circular shape is folded by clamping the center portion thereof and folding from both ends thereof at a predetermined width by using a folding bar or the like or bellows folding (accordion folding) in which a plurality of steps or valley foldings are formed from upper and lower sides of the air bag while maintaining the air bag as shown in FIG. 4. Further, although the width of the lateral folding can be optionally selected as far as the air bag is housed within the cover, it is set to be substantially the same width as the vertical width of the inflator 12. In FIG. 3, numeral 25 denotes an air suction hole, numeral 26 denotes a tether or a connection web for limiting the inflation of the air bag and numeral 28 denotes one or more air discharge holes.

An outer end of the outwardly winding roll R is positioned in an outer side of the H-shaped tear seam 22 formed on the interior surface of the cover 16. The positions of the winding roll ensure that the winding roll R engages the overhang portion formed, when the hinged doors 18 are opened by the inflation force of the air bag. As a result, the object of the present invention, that is, control over the middle portion of the inflation speed of the air bag at a time when the air bag apparatus operates can be securely obtained.

Next, the above described embodiment is assembled in the following order.

First, a bag retainer or a bag holding ring 241 as shown in FIG. 1, is set within the air bag 14. Then, a lateral folding operation is performed so as to form a laterally long and narrow shape as shown in FIG. 3B. Then, both of right and left sides of the laterally long and narrow shape are wound in an outwardly winding roll R as shown in FIG. 1. This formed shape, the folded state, may be temporarily tacked or held in place by a band or a film which can be easily broken at a time when the air bag is deployed or inflated.

Next, the folded air bag 14 is attached to the inflator 12 through the bag retainer 24 together with the bag holder or housing case, 20 by screwing or the like. Finally, the cover 16 is attached to the bag holder 20.

It is preferable to cover both the right and left side gas discharge holes 12b among the plurality of gas discharge holes 12b of the inflator 12 with a cloth or the like so that air can be preferentially discharged in a vertical direction, thereby assuring that the air bag can be preferentially developed or deployed in a vertical direction.

Further, in order to preferentially flow the discharged gas from the inflator 12 in a vertical direction, a bag-shaped or belt-shaped cloth which can limit the gas flow may be disposed as described in Japanese Patent Unexamined Publication No. 3-28146.

Next, an embodiment for using the above embodiment will be explained.

The air bag apparatus can be assembled to a steering wheel in a conventional manner and the steering wheel is attached to the vehicle body.

When the vehicle body receives an impact load equal to or more than a predetermined value, the inflator 12 is actuated by a detecting signal from an impact sensor (not shown) so that gas is explosively generated from a gas generator in the form of inflator 12. The generated gas is discharged from the gas discharge holes 12b of the inflator 12 and flows into the air bag 14. Then, the air bag 14 will develop and inflate as it deploys. At the same time, the H-shaped tear seam 22 is broken by the total developing and inflating force of the air bag 14 so that the hinged door portions 18 are opened in both an upper and lower direction.

At that time, each of the right and left outwardly winding rolls R will develop beginning with the initial time of developing and inflating the air bag 14 to the time immediately before the air bag 14 is completely developed and inflated. However, the developing of the outwardly winding roll R is temporally reserved since the outer side surface of the outwardly winding roll R is brought into contact with opposing side walls 20a in the housing space S opposing to the outer side surface and the side portions 19 of the cover 16.

Then, even when the outwardly winding roll R is going to further develop, the outwardly winding roll R engages the side portions 19 adjacent the front surface and close to the outer side as referenced by the double dotted chain line in FIG. 1, so that the developing of the outwardly winding roll R is temporally reserved or deployed in a secure manner. This is because the side portions 19, corresponding to a wall for forming the housing space S of the cover 16, forms an overhang portion which covers the front surface of the outwardly winding roll R close to the outer side. Accordingly, the air bag 14 is preferentially developed in a vertical direction in which no member exists for limiting the developing air bag (refer to FIG. 2C).

Similarly, the inflation speed of the air bag 14 toward the occupant to be protected, that is, the inflation speed at the middle portion is also limited since the outer side portions of the right and left outwardly winding rolls R are brought into contact with the opposing wall side walls 20a in the housing space and with the side portions 19 corresponding to the overhang portion. Then, the engagement with respect to the side portions 19, corresponding to the overhang portion of the right and left outwardly winding rolls R, is gradually removed so that the air bag 14 is slowly developed toward the sides or laterally and the developing and inflation of the air bag 14 is then completed (refer to FIG. 2D).

In the above embodiment, the overhang portion is formed along the outer side of the tear seam of the hinged door portions 18 in the cover 16, that is, in the side portions 19 adjacent to the right and left outer sides. However, it is also possible to form an overhang portion without using the cover 16 as described below.

In the case that the bag holder 20 for holding the air bag 14 is provided with side walls 20a projecting toward the cover 16, the overhang portion may be formed by a side wall extending portion 20b of the side wall 20a (see the double dotted chain line in FIG. 1).

Figure 9:
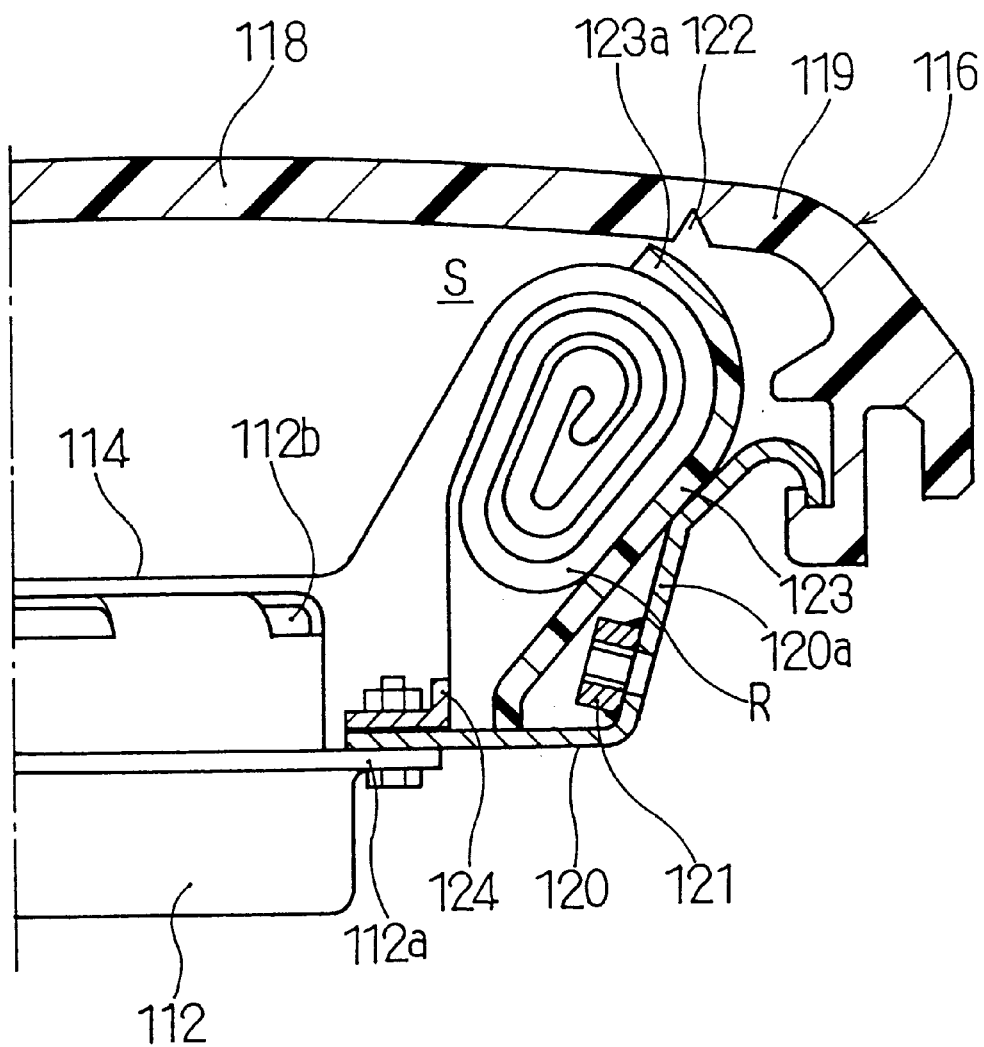
FIG. 9 is a schematic cross-sectional view which shows a half of an air bag apparatus in accordance with another embodiment of the present invention.

Further, as shown in FIG. 9, where side wall 120a of air bag holder 120 is provided with a projection, such as a metal projection threaded at 121 for receiving a bolt or the like, in an inside thereof and an air bag protecting plate, normally made of synthetic resin, 123 for covering the bolt screwing portion 121 is attached thereto, an overhang portion may be formed from an extension portion in a protecting plate extending portion 123a of the bag protecting plate 123. In the embodiment shown in FIG. 9, numerals shown as a combination of the numerals and a hundred denotes the same elements as shown in FIG. 1, respectively, and the explanation thereof is omitted.

In a structure in which the overhang portion is not formed by the cover 16 (116), when the air bag 14 (114) attached to the bag holder 20 (120) is assembled to the reversed cover 16 (116), the folded state of the air bag could be maintained by an overhang portion which is formed from the side wall extending portion 20b extending from the bag holder side wall 20a or by the protecting plate extending portion 123a extending from the bag protecting plate 123 so that the deformation in the folding of the air bag 14 (114) can be prevented.

Further, if the outer end of the outwardly winding roll R of the bag body 14 (114) is not positioned in the right and left outer sides of the H-shaped tear seam 22 in the cover 16 (116), that is, if it is positioned in the right and left inner sides, the development of the air bag to the lateral direction can be limited by the overhang portion so that the object of developing and inflating the air bag body in a vertical direction out of the front of the cover can be achieved.

Accordingly, even when the H-shaped tear seam is in the outer side, that is, with no relation to a position in which the H-shaped tear seam breakage prescribed portion is formed, the objects of the present invention can be achieved and the degree of freedom of designing a cover can be increased.

Figure 5:
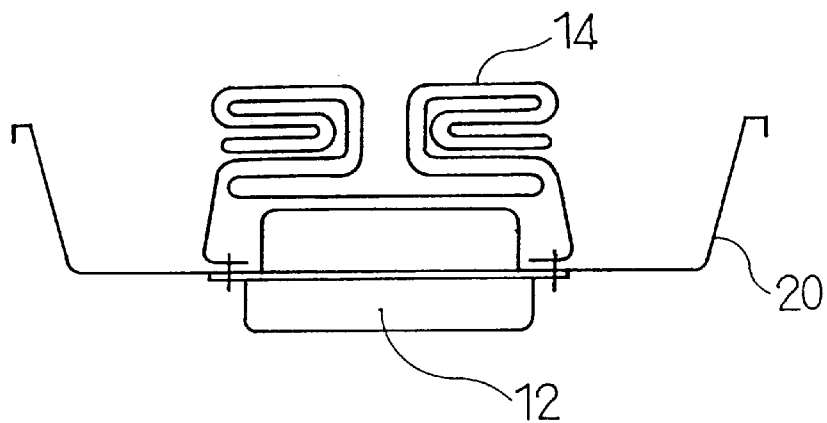
FIG. 5 is a cross-sectional view of a folded air bag which shows a folding embodiment except the present invention used for an inflation test (in this view, a cover is omitted and this view is a view along a line B—B of FIG. 2)
Figure 6:
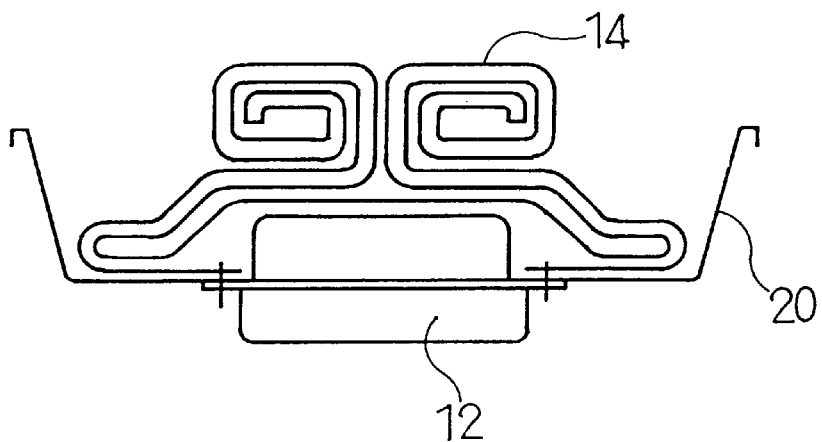
FIG. 6 is a cross-sectional view of an air bag which similarly shows another folding embodiment except the present invention (in this view, a cover is omitted and this view is a view along a line A—A of FIG. 2)
Figure 7:
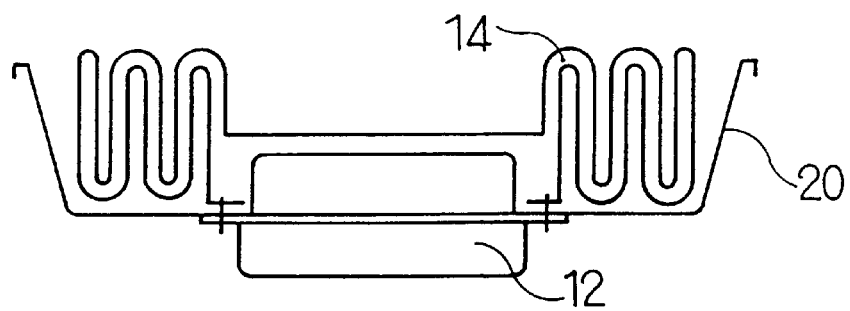
FIG. 7 is a cross-sectional view of an air bag which similarly shows another folding embodiment except the present invention (in this view, a cover is omitted and this view is a view along a line A—A of FIG. 2)
Figure 8:
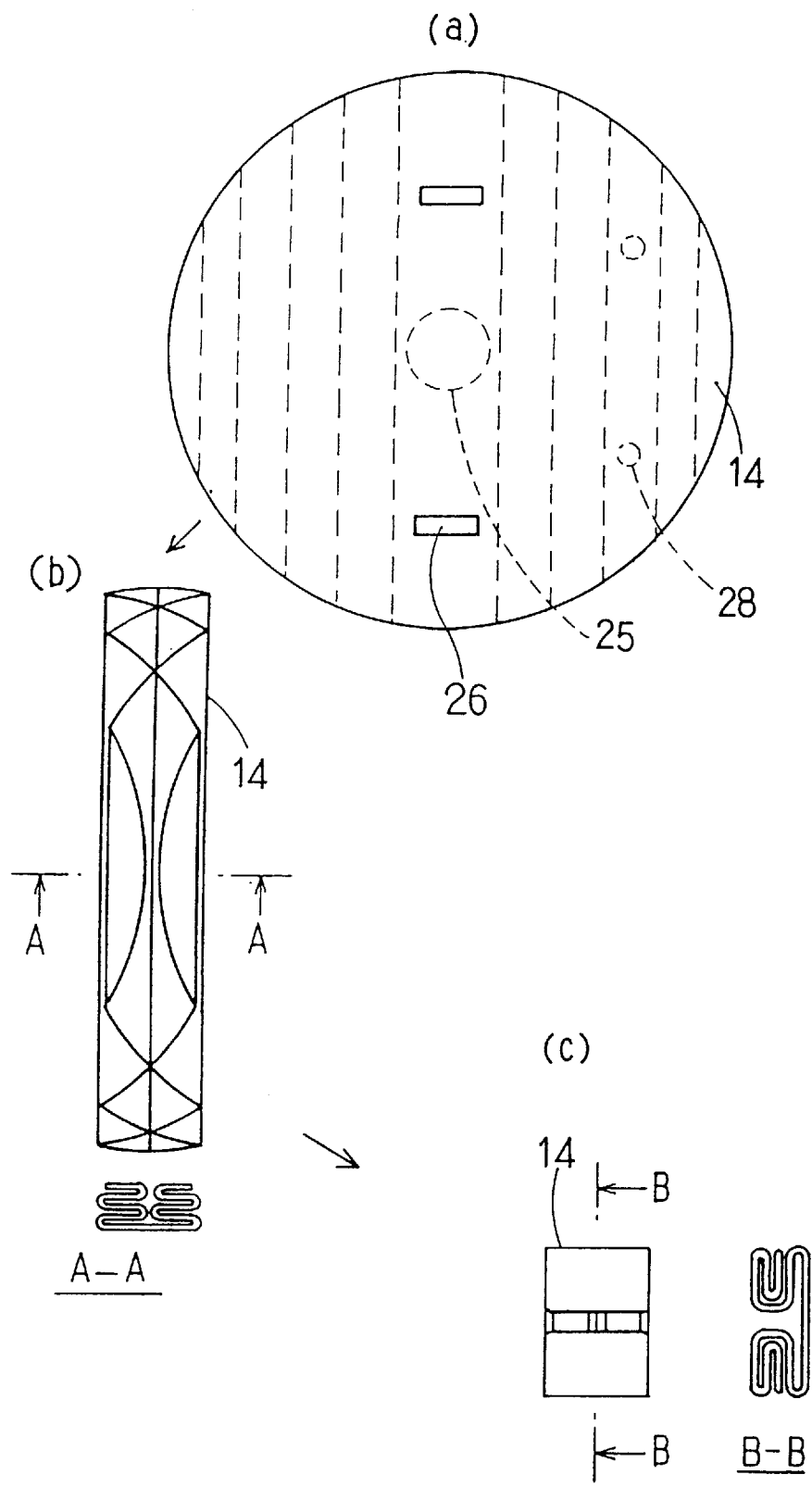
FIGS. 8A, 8B, 8C, 8D and 8E are views which explain a method for folding the air bag shown in FIG. 6.

In FIG. 10, with respect to the inflation speeds in the middle portion height, the folding embodiment of the present invention indicates low speeds independently of the provision of a cover, while on the other hand, airbags folded according to the other folding embodiments illustrated in FIGS. 5, 6 and 7 indicate higher speeds.

While the invention has been described in connection with what are presently considered to be the most practical and preferred embodiments it is to be understood that the invention is not to be limited to the disclosed embodiments, but on the contrary, is intended to cover various modifications and equivalent arrangements included within the spirit and scope of the appended claims.

What is claimed is:

1. An air bag apparatus, assembled in a vehicle steering wheel and which develops and inflates an air bag in a direction toward a vehicle occupant at a time of operation, comprising:

an inflator, an air bag which is mounted to substantially a center of an upper surface of said inflator in a folded state and a cover positioned over said folded air bag;

said cover comprising a hinged door portion which is opened by a force applied at a time when said air bag is initially developed and inflated; and said air bag being folded in a direction so as to be formed into a long and narrow shape having a predetermined width and end portions being wound into an outwardly wound roll, said outwardly wound end portions being housed within a housing space formed by said inflator and said cover.

2. An air bag apparatus as recited in claim 1, wherein said housing space is provided by an overhang portion formed from a side portion of said cover.

3. An air bag apparatus as recited in claim 2, wherein said overhang portion is formed by a portion of said cover disposed adjacent the right and left outer side of said hinged door portion.

4. An air bag apparatus as recited in claim 3, wherein said cover is provided with a H-shaped tear seam and said hinged door portion is formed as a double-leafed hinged door with said outwardly wound roll end portions being positioned outside of right and left sides of said H-shaped tear seam.

5. An air bag apparatus as recited in claim 1, wherein said cover is provided with a H-shaped tear seam and said hinged door portion is formed as a double-leafed hinged door with said outwardly wound roll end portions being positioned outside of right and left sides of said H-shaped tear seam.

6. An air bag apparatus as recited in claim 2, wherein said cover body is provided with an H-shaped tear seam and said hinged door portion is formed as a double-leafed hinged door with said outwardly wound roll end portions being positioned outside of right and left sides of said H-shaped tear seam.

7. An air bag apparatus as recited in claim 2, wherein a bag holder for holding said air bag is provided with a side wall extending to said cover and the overhang portion further includes a side wall extending portion which extends inwardly above said outwardly wound end portions.

8. An air bag apparatus as recited in claim 2, wherein a bag holder for holding said air bag is provided with a side wall extending to said cover, said side wall including an interiorily directed projecting portion at an inner side thereof, a bag protecting plate mounted to an interior port inwardly of said projecting portion and including an inwardly extending portion.

* * * * *